US009507595B2

(12) United States Patent
Gschwind et al.

(10) Patent No.: US 9,507,595 B2
(45) Date of Patent: Nov. 29, 2016

(54) EXECUTION OF MULTI-BYTE MEMORY ACCESS INSTRUCTION SPECIFYING ENDIAN MODE THAT OVERRIDES CURRENT GLOBAL ENDIAN MODE

(71) Applicant: International Business Machines Corporation, Armonk, NY (US)

(72) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 14/193,491

(22) Filed: Feb. 28, 2014

(65) Prior Publication Data
US 2015/0248291 A1    Sep. 3, 2015

(51) Int. Cl.
*G06F 9/312* (2006.01)
*G06F 9/30* (2006.01)
*G06F 15/80* (2006.01)

(52) U.S. Cl.
CPC ....... *G06F 9/30043* (2013.01); *G06F 9/30007* (2013.01); *G06F 9/30036* (2013.01); *G06F 9/30098* (2013.01); *G06F 9/30185* (2013.01); *G06F 9/30189* (2013.01); *G06F 15/8061* (2013.01); *G06F 15/8076* (2013.01)

(58) Field of Classification Search
CPC ....... G06F 9/30032–9/30036; G06F 9/30043; G06F 9/30101; G06F 13/4013
See application file for complete search history.

(56) References Cited

U.S. PATENT DOCUMENTS

| 5,781,763 | A | 7/1998 | Beukema et al. |
| 5,907,865 | A * | 5/1999 | Moyer ............... G06F 7/768 |
| | | | 711/201 |
| 6,295,599 | B1 | 9/2001 | Hansen |
| 2005/0066146 | A1 | 3/2005 | Barry et al. |
| 2008/0114968 | A1 | 5/2008 | Gonion |

(Continued)

FOREIGN PATENT DOCUMENTS

| EP | 0729093 A1 | 8/1996 |
| WO | 2006065689 A1 | 6/2006 |

OTHER PUBLICATIONS

Sun et al., "HAIL: A Language for Easy and Correct Device Access" DoCoMo Communication Laboratories USA, Inc. San Jose, CA, 2005, 9 pages.

(Continued)

*Primary Examiner* — Kenneth Kim
(74) *Attorney, Agent, or Firm* — Cantor Colburn LLP; Steven Bennett

(57) ABSTRACT

An aspect includes implementing endian-mode-sensitive memory instructions for a vector processor. One such system includes a byte addressable memory and a processor. The processor includes a register that includes a plurality of byte elements 0 to S. The system is configured to perform a method that includes obtaining an instruction by the processor and determining that the instruction is a memory access instruction specifying the register and a memory address. In response to the determination that the instruction is a memory access instruction and independent of a current global endian mode setting that is selectable in the processor, the memory access instruction is executed by copying the byte data between the memory and the register so that the byte element n of the register corresponds to the memory address+n for n=0 to S.

11 Claims, 7 Drawing Sheets

(56) References Cited

U.S. PATENT DOCUMENTS

| | | | |
|---|---|---|---|
| 2008/0215653 A1* | 9/2008 | Fenzl | G06F 9/30181 708/400 |
| 2010/0106944 A1 | 4/2010 | Symes et al. | |
| 2011/0191569 A1* | 8/2011 | Ishikawa | G06F 12/04 712/204 |
| 2012/0011490 A1 | 1/2012 | Mizuno et al. | |

OTHER PUBLICATIONS

U.S. Appl. No. 14/724,995; Non-Final Office Action, Date Filed: May 29, 2015; Date Mailed: May 10, 2016; 15 pages.

* cited by examiner

EXECUTION OF MULTI-BYTE MEMORY ACCESS INSTRUCTION SPECIFYING ENDIAN MODE THAT OVERRIDES CURRENT GLOBAL ENDIAN MODE

BACKGROUND

The present application relates generally to data processing, and more specifically, to processor architecture. Binary data is organized in memory as 8-bit units called "bytes," while the registers implemented by a processor may be larger than a single byte. The terms "endian" and "endianness" refer to how bytes of a multi-byte element are ordered within memory as data is moved between registers and memory.

Individual bytes of a multi-byte element are generally stored in consecutive memory addresses (e.g., 4 consecutive addresses for a 32-bit element). A big-endian processor stores the most significant byte of the multi-byte element in the lowest address of the consecutive range, and stores the least significant byte in the highest address. In contrast, a little-endian processor stores the least significant byte in the lowest address. Put another way, bytes of increasing numeric significance are stored to increasing memory addresses by a little-endian processor, while a big-endian processor stores decreasing numeric significance with increasing memory addresses.

Consider, as an example, the 4-byte element "0A 0B 0C 0D" and a memory range with offsets 0-3. A big endian processor places the first byte ("0A") in offset 0, the second byte ("0B") in offset 1, the third byte ("0C") in offset 2, and the last byte ("0D") in the last offset, 3. A little-endian processor uses the reverser order, placing the first byte ("0A") in offset 3, the second byte ("0B") in offset 2, the third byte ("0C") in offset 1, and the last byte ("0D") in the first offset, 0.

A conventional processor that supports big-endian and little-endian byte-ordering uses a mode indication that for all memory operations directs the processor to either perform all memory operations in accordance with a big endian mode, or all memory operations in accordance with a little-endian mode. That is, when in big-endian mode, the conventional processor uses big-endian byte-ordering when transferring data between the processor and memory, and when in little-endian mode, uses little-endian byte-ordering when transferring data between the processor and memory. This implementation works well when accessing singular, scalar values, but not when accessing vectors.

A vector is defined as a collection of scalar values, also referred to as vector elements. Vector elements can be bytes, halfwords (2 bytes), words (4 bytes), doublewords (8 bytes), and larger. Vectors are addressed in memory by the address of the first element in the vector. In this context, "vectors" are numbered sequences of individual, distinctly addressable elements, regardless of these elements are stored in a vector register, a general purpose register, a floating point register, a vector-scalar register, or another register type.

Conventional processors that support both big-endian and little-endian byte-ordering are generally implemented either as a big-endian-based system with added support for little-endian byte-ordering, or as a little-endian-based system with added support for big-endian byte-ordering. That is, processing of vector data is conventionally performed with a left-to-right element ordering for big-endian-based systems and a right-to-left element ordering for little-endian-based systems. When loading little-endian data on a big-endian-based system, or loading big-endian data on a little-endian-based system, while the byte-ordering of each vector element is reversed as needed. However, a side effect also occurs in that the ordering of vector elements in the register is also reversed.

While most vector operations are insensitive to the ordering of elements in a register, there are classes of vector operations that are dependent on the ordering of the elements in a vector and will not produce correct results unless vector elements are presented in reverse order. Examples of such operations include but are not limited to permute operations, string processing operations, and cryptographic processing which operate on arrays of byte-sized elements and which depend on the ordering of the vector elements, or any other operations that make reference to a natural ordering of elements in memory.

The conventional solution of implementing storage accesses that perform a byte-reverse on data transferred between the processor and memory when the endian mode is opposite to the base implementation endianness of the system also causes the ordering of vector elements to be reversed, thus creating problems for these types of vector operations that process this data. To date, those skilled in the art have not been able to resolve this problem, as demonstrated by the omission of string operations from the little-endian specification of the Power architecture when bi-endian support was first introduced to the industry.

SUMMARY

Embodiments include a system and computer program product for implementing endian-mode-independent instructions. One such system includes a byte addressable memory and a processor. The processor includes a register that includes a plurality of byte elements 0 to S. The system is configured to perform a method that includes obtaining an instruction by the processor and determining that the instruction is a memory access instruction specifying the register and a memory address. In response to the determination that is instruction is a memory access instruction and independent of a current global endian mode setting that is selectable in the processor, the memory access instruction is executed by copying the byte data between the memory and the register so that the byte element n of the register corresponds to the memory address+n for n=0 to S.

One such method is a computer-implemented method for copying data between a vector register and a memory that is byte addressable. The vector register includes a plurality of byte elements 0 to S. The method includes obtaining, by a processor in a computer, a vector instruction, and determining that the vector instruction is a memory access instruction specifying the vector register and a memory address. In response to the determination that the instruction is a memory access instruction and independent of a current global endian mode setting that is selectable in the processor, the processor executes the memory access instruction by copying the data between the memory and the vector register so that a byte element n of the vector register corresponds to a memory address+n for n=0 to S.

One such computer program product is for copying data between a vector register that is composed of byte elements 0 to S and a memory that is byte addressable. The computer program product includes a tangible storage medium readable by a processing circuit and storing instruction for execution by the processing circuit for performing a method comprising obtaining, by the processing circuit, a vector instruction, and determining that the vector instruction is a memory access instruction specifying the vector register and a memory address. In response to the determination that the instruction is a memory access instruction and independent of a current global endian mode setting that is selectable in the processing circuit, the processing circuit executes the memory access instruction by copying the data between the memory and the vector register so that a byte element n of the vector register corresponds to a memory address+n for n=0 to S.

BRIEF DESCRIPTION OF THE SEVERAL
VIEWS OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

Figure 1:
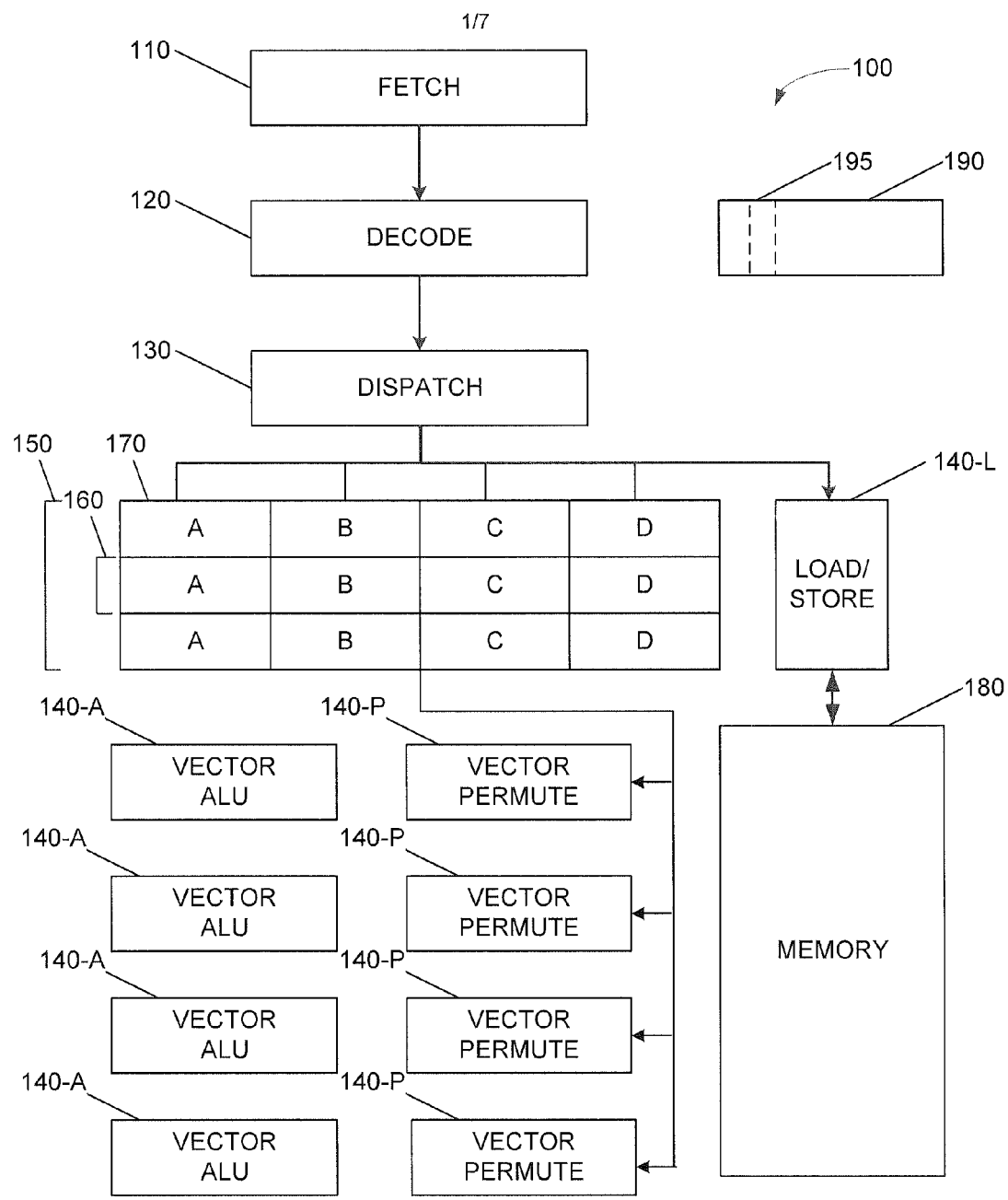
FIG. 1 depicts a block diagram of a vector processor in accordance with an embodiment.

A single instruction, multiple data (SIMD) processor uses a single instruction to perform the same operation on different data values. Multiple instances of the same type of functional unit are used so that the operation is performed on all of the data values simultaneously. These data values can be viewed as a vector, so the SIMD processor is referred to herein as a "vector processor. Embodiments described herein provide inventive techniques for transferring data between memory and a register in a vector processor that is bi-endian (i.e., supports both big-endian and little-endian modes) and that has a current endian-mode.

One such embodiment of a vector processor disclosed herein provides endian-mode-sensitive instruction load and store instructions, in which one particular endian mode (e.g., big-endian or little-endian) is used when transferring data between memory and a vector register, based on the current endian-mode of the processor.

Another embodiment of a vector processor disclosed herein provides endian-mode-independent load and store instructions, in which the instruction itself, rather than the current endian-mode of the processor, controls the endian mode to be used when transferring data between memory and a vector register. In some embodiments, the endian-mode is specified directly in the instruction (e.g., by an endianness field). In other embodiments, the endian behavior is specified indirectly, for example, the byte order behavior is based on the particular vector register specified in the instruction Vector processor embodiments with endian-mode-independent instructions may also provide endian-mode-dependent instructions.

Endian-mode-independent instructions may be advantageous, for example, when dealing with cryptographic operations that specify processing of vector elements in a particular memory order. For example, the Advanced Encryption Standard (AES), also known as the Federal Information Processing Standards (FIPS) 197, treats data structures as a sequential array of bytes, and specifies cryptographic operations that access memory in increasing address order. Using conventional endian-mode-sensitive memory accesses for such operations causes data inversion and produces incorrect results unless additional instructions are used to reverse the order.

For example, an AES Inverse Cipher instruction typically operates on encrypted data that is placed in a register by a load instruction. An example of such code (using the vncipher instruction described in Power ISA v2.07 and incorporated herein by reference) is shown below:

| lxvx | vSRC, rA, rB |
| vncipher | vT2, vSRC |

This code does work for big-endian, because the load instruction (lxvx) is endian-mode-sensitive. However, in little-endian mode the data would be loaded in byte-reversed order, and would therefore be problematic for the AES Inverse Cipher instruction (vncipher), which requires source operands to be in big-endian byte ordering. Thus, to enable processing AES encrypted data in little endian mode additional code is needed to byte-reverse the encrypted data that is loaded using lxvx, before the data is used by vncipher. An example of this additional code, using the vbrq instruction to byte-reverse the contents of vSRC, is shown below.

| lxvx | vSRC, rA, rB |
| vbrq | vSRC, rSRC |
| vncipher | vT2, vSRC |

Because the above reversal code works only in little-endian mode, encryption software need to include two different versions, one for big-endian mode and one for little-endian mode.

The endian-mode-independent memory access instructions provided by vector processor embodiments described herein avoid this need for instructions that reverse the order. For example, an endian-mode-independent load vector instruction (e.g., lxvb16x) could be used, and the same code will work for either big-endian or little-endian mode.

| lxvb16x | vSRC, rA, rB |
| vncipher | vT2, vSRC |

Advantageously, endian-mode independent operations can be combined with mode-dependent code to process AES functions, or other code which requires big-endian data ordering regardless of operating mode. For example, source programs generally depend on the layout of pointers and other data structures on the endian mode of the system, requiring endian mode accesses to load pointers, but such programs also process data, copy memory areas, strings and other data in a strictly sequential order where mode independent operations may enable better code generations.

Thus, for example, when a block of data is to be encrypted with the AES function, and the data block address is contained in memory based on the endian mode of the program, a program may load the address using a mode-dependent load instruction, followed by a mode-independent load of the data block to be encrypted using an exemplary-big endian load instruction and a big-endian vncipher instruction. The following code example uses a mode-sensitive load instruction ld that loads an address of the data block to be encrypted from a memory address specified by r4, responsive to an endian mode specified in a machine state register MSR (e.g., MSR[LE] in accordance with the Power ISA) into register r5. Then, the code performs a mode-independent vector load to load a big-endian memory image of 16 bytes in sequential element order into the vector register in a left to right data ordering using the mode-independent exemplary big-endian vector load lxvb16x from the address contained in register r5 into vector register v1. The code then performs a left to right vncipher operation on the value in v1 and stores the result in v2. The next instruction performs a mode-independent store stxvb16x of the encrypted big-endian data in v2 back to the address in r5. The next instruction adds 16 to the address in r5 to point to the next unprocessed memory byte. A final mode-dependent store stores the address in r5 into memory based on the current endian mode in either big- or little endian mode.

The code example uses a mode-sensitive load instruction ld that loads an address of the data block to be copied from a memory address specified by (0) r4, responsive to an endian mode specified in a machine state register MSR (e.g., MSR[LE] in accordance with the Power ISA) into register r5. Them, the code example uses a mode-sensitive load instruction ld that loads an address of the data block area to be written from a memory address specified by (8) r4, responsive to an endian mode specified in a machine state register MSR (e.g., MSR[LE] in accordance with the Power ISA) into register r6. Then, the code performs a mode-independent vector load to load a big-endian memory image of 16 bytes in sequential element order into the vector register in a left to right data ordering using the mode-independent exemplary big-endian vector load lxvb16x from the address contained in register r5 into vector register v1. Then, the code performs a mode-independent vector store to store a big-endian memory image of 16 bytes in sequential element order from the vector register v1 in a left to right data ordering using the mode-independent exemplary big-endian vector store stxvb16x from the address contained in register r6. Finally, the program concludes by incrementing the addresses in registers r5 and r6 to point to the next 16 byte memory area, and stores the updates addresses back to the memory locations 0(r4) and 8(r4) using the mode-dependent load instructions to store addresses in the current endian mode of the program

|        |              |
| ------ | ------------ |
| ld     | r5, 0, r4    |
| lxvb16x | v1, r0, r5  |
| vncipher | v2, v1     |
| stxvb16x | v2 , r0, r5 |
| addi   | r5, r5, 16   |
| std    | r5, 0, r4    |

Other memory examples are imaginable. In one embodiment, a big-endian memory copy is performed. In accordance with an exemplary operation, a function receives two addresses in consecutive locations stored at address r4, with address 0(r4) containing a source address in the program's current endian mode of a 16 byte memory area to be copied, and address 8(r4) containing a target address in the program's current endian mode where the 16 byte memory area is be copied,

|          |            |
| -------- | ---------- |
| ld       | r5, 0, r4  |
| ld       | r6, 8, r4  |
| lxvb16x  | v1, r0, r5 |
| stxvb16x | v1, r0, r6 |
| addi     | r5, r5, 16 |
| addi     | r6, r6, 16 |
| std      | r5, 0, r4  |
| std      | r6, 8, r4  |

Referring to FIG. 1, a block diagram of a vector processor is generally shown. During operation of the vector processor 100, instructions are fetched by an instruction fetch unit 110 and supplied to an instruction decode unit 120. Decoded instructions are passed to a dispatch unit 130. The dispatch unit 130 causes each instruction to be executed by providing control signals and data to an appropriate one or more of the execution units 140 of the vector processor 100. In doing so, the dispatch unit 130 may resolve branch instructions and store non-branch instructions until ready for execution. The dispatch unit 130 is sometimes referred to as an "issue/branch unit." In some embodiments, the dispatch unit 130 contains prediction logic, instruction reordering logic, issue buffers, and/or other logic to implement instruction dispatch.

When an instruction references a register, the dispatch unit 130 accesses a register file before supplying the instruction to an appropriate one or more of the execution units 140. The vector processor 100 includes a vector register file 150, which is a collection of individual vector registers 160. Other embodiments may include an integer register file or a floating point register file. Some embodiments share register files (e.g., a combined integer and floating point register file), and additional register files may be present (e.g., a condition or predicate register file for comparison results).

A vector register 160 stores structured data, so each vector register 160 is partitioned into M fields 170, each storing a single field of the structured data. For example, a 128-bit vector register file can be partitioned into sixteen 8-bit byte fields, eight 16-bit half-word fields, or four 32-bit word fields. The vector processor 100 performs vector processing by providing each one of the vector register fields 170 to an instance of a vector execution unit 140. The vector processor 100 shown in FIG. 1 includes vector arithmetic logic units 140-ALU and vector permute units 140-PER.

Some vector instructions perform an operation that involves one or more registers, in which case appropriate vector execution unit(s) 140 receive data from fields 170 in vector registers 150. Some vector instructions access memory 180, in which case the dispatch unit 130 provides these memory access instructions to a load/store unit 140-L. The load/store unit 140-L may implement a load instruction which copies from memory 180 to one of the vector registers 160 and a store instruction which copies from one of the vector registers 160 to memory 180. As noted above, a register-memory transfer involves accessing bytes in a particular order, either big-endian or little-endian. The vector processor 100 includes a machine state register 190 with an endian-mode field 195. Thus, endian-mode field 195 acts as a global end-mode setting. However, as noted above, endian-mode-sensitive instructions operate according to the current endian-mode 195, while the current endian-mode field 195 is ignored by endian-mode-independent instructions.

While the description herein focuses on vector instructions, vector registers 160, and vector execution units 140, persons of ordinary skill in the art should appreciate that the vector processor 100 may also handle integers, and fixed or floating point numbers, and may thus include corresponding register files and logic units which will not be discussed further.

Figure 2:
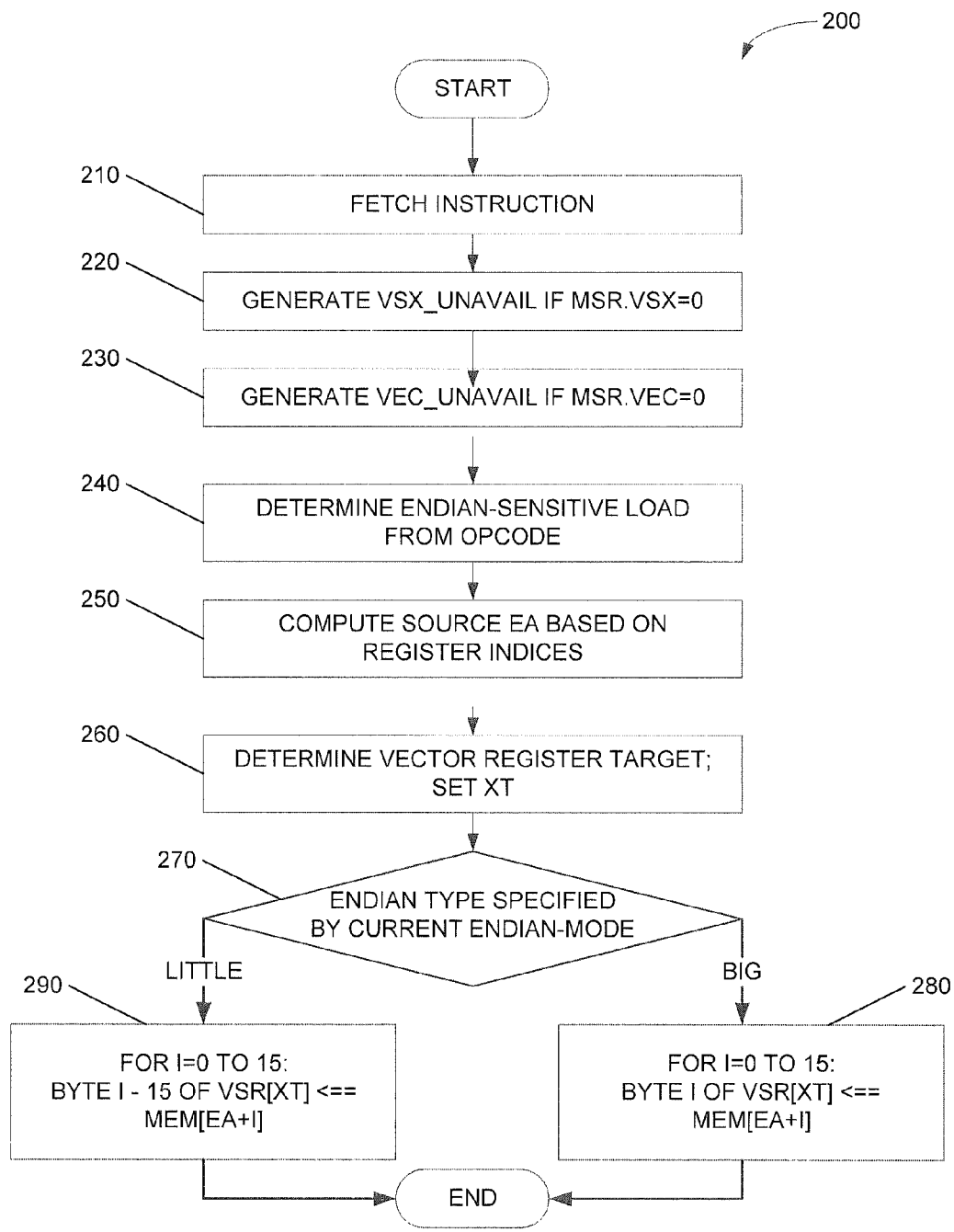
FIG. 2 depicts a process flow for an endian-mode-sensitive vector load instruction in accordance with an embodiment.

Referring to FIG. 2, a process flow is shown for executing an endian-mode-sensitive vector load instruction, in accordance with an embodiment of the vector processor 100. In this example embodiment, the endian-mode-sensitive vector load instruction uses the syntax lxvx(XT, RA, RB) and the following instruction format:

| 0  | 6 | 11 | 16 | 21  | 31 |
|----|---|----|----|-----|----|
| 31 | T | RA | RB | 812 | Tx | where RA and RB are index registers which combine to form an effective address into memory 180 as the source of the load, and the T field and the Tx bit combine to specify a particular vector register 160 as the target of the load.

The process 200 begins at block 210, where the endian-mode-sensitive vector load instruction is fetched, or obtained, from memory. Persons of ordinary skill in the art should appreciate that instructions may be stored in the same memory as data, or in different memory, and may be stored in main memory or cache memory. The vector processor 100 then checks for exceptions. At block 220, a Vector Scalar Extensions Unavailable (VSX_Unavailable) exception is generated if a VSX bit in the machine state register 190 is not set. At block 230, a Vector Scalar Unit Unavailable (VEC_Unavailable) exception is generated if a VEC bit in the machine state register 190 is not set.

If no exceptions are raised, the vector processor 100 continues decoding at block 240, where the vector processor 100 examines the opcode field(s) in the fetched instruction and determines that the instruction corresponds to an endian-mode-sensitive vector load instruction (lxvx). Next, at block 250, the vector processor 100 computes the effective address into memory 180, i.e., the source address of the load. The effective address is computed using the index registers specified by the RA and RB fields in the instruction. In some embodiments, the effective address EA is the sum of the contents of the RBth entry in the vector register file 150 plus either the contents of the RAth entry in the vector register file 150 or zero if RA is zero. In other words, EA=((RA=0) ? 0: GPR[RA])+$_{tea}$GPR[RB].

The vector processor 100 continues decoding at block 260 by determining the target register of the load, specified by the Tx and T bits in the fetched instruction. In some embodiments, the target register is an index into the vector register file 150, computed as VSR[XT]=32*Tx+T.

Next, at block 270 the vector processor 100 determines whether the vector instruction fetched at block 210 specifies big-endian byte ordering or little-endian byte ordering, by examining the endian-mode field 195 in the machine state register 190. If the endian mode is specified as big-endian byte ordering, then processing continues at block 280. If the endian mode is specified as little-endian byte ordering, then processing continues at block 290.

The vector processor 100 performs a big-endian vector load at block 280 by copying 16 bytes (128 bits) from the source memory address to the target vector register such that: the contents of the byte in memory at address EA are placed into the first byte element (byte element 0) of the target register VSR[XT]; the contents of the byte in memory at address EA+1 are placed into the next byte element (byte element 1) of the target register VSR[XT]; and so on until the contents of the byte in memory at address EA+15 are placed into the last byte element (byte element 15) of the target register VSR[XT]. Execution of the endian-mode-independent vector load is then complete.

If, however, the vector processor 100 determined at block 270 that little-endian byte order is specified, then at block 290 the vector processor 100 copies 16 bytes (128 bits) from the source memory address to the target vector register such that: the contents of the byte in memory at address EA are placed into the last byte element (byte element 15) of the target register VSR[XT]; the contents of the byte in memory at address EA+1 are placed into the next-to-last byte element (byte element 14) of the target register VSR[XT]; and so on until the contents of the byte in memory at address EA+15 are placed into the first byte element (byte element 0) of the target register VSR[XT].

Figure 3:
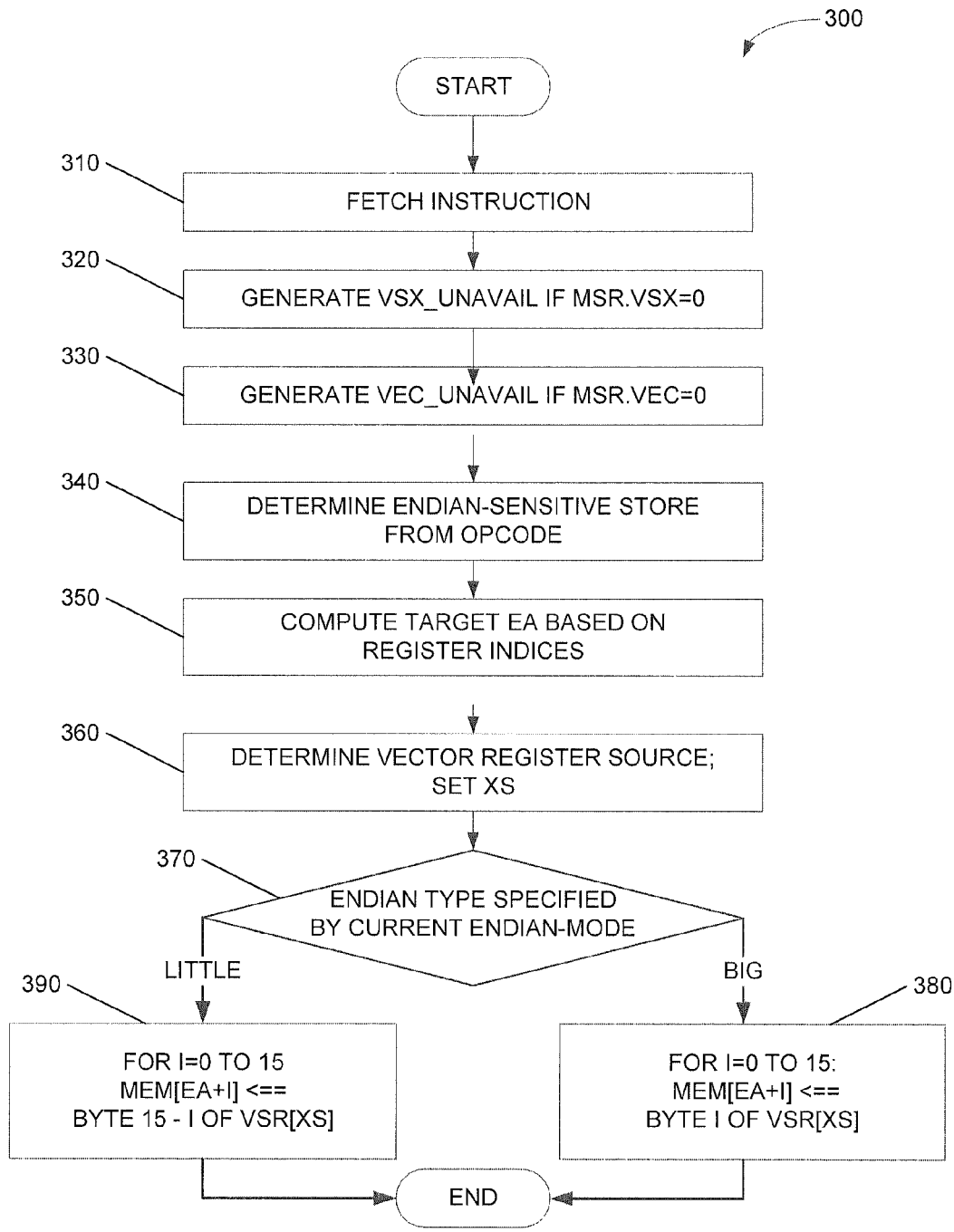
FIG. 3 depicts a process flow for an endian-mode-sensitive vector store instruction in accordance with an embodiment.

Referring to FIG. 3, a process flow is shown for executing an endian-mode-sensitive vector store instruction, in accordance with an embodiment of the vector processor 100. In this example embodiment, the endian-mode-sensitive vector load instruction uses the syntax stxvx (XS, RA, RB) and the following instruction format:

| 0  | 6 | 11 | 16 | 21  | 31 |
|----|---|----|----|-----|----|
| 31 | S | RA | RB | 940 | Sx | where the S field and the Sx bit combine to specify a particular vector register 160 as the source of the store, and RA and RB are index registers which combine to form an effective address into memory 180 as the target of the store.

The process 300 begins at block 310, where the next instruction is fetched, or obtained, from memory. Persons of ordinary skill in the art should appreciate that instructions may be stored in the same memory as data, or in different memory, and may be stored in main memory or cache memory. The vector processor 100 then checks for exceptions. At block 320, a Vector Scalar Extensions Unavailable (VSX_Unavailable) exception is generated if a VSX bit in the machine state register 190 is not set. At block 330, a Vector Scalar Unit Unavailable (VEC_Unavailable) exception is generated if a VEC bit in the machine state register 190 is not set.

If no exceptions are raised, the vector processor 100 continues decoding at block 340, where the vector processor 100 examines the opcode field(s) in the fetched instruction and determines that the instruction corresponds to an endian-mode-sensitive vector store instruction (stxvx). Next, at block 350, the vector processor 100 computes the effective address into memory 180, i.e., the target address of the store. The effective address is computed using the index registers specified by the RA and RB fields in the instruction. In some embodiments, the effective address EA is the sum of the contents of the RBth entry in the vector register file 150 plus either the contents of the RAth entry in the vector register file 150 or zero if RA is zero. In other words, EA=((RA=0) ? 0: GPR[RA])+$_{tea}$GPR[RB].

The vector processor 100 continues decoding at block 360 by determining the source register for the store, specified by the Sx and S bits in the fetched instruction. In some embodiments, the target register is an index into the vector register file 150, computed as VSR[XS]=32*Sx+S.

Next, at block 370, the vector processor 100 determines whether the vector instruction fetched at block 310 specifies big-endian byte ordering or little-endian byte ordering by examining the endian-mode field 195 in the machine state register 190. If the endian mode is specified as big-endian byte ordering, then processing continues at block 380. If the instruction specifies little-endian byte ordering, then processing continues at block 390.

The vector processor 100 performs big-endian vector store at block 380 by copying 16 bytes (128 bits) from the source vector register to the target memory address such that: the contents of the first byte element (byte element 0) of the source register VSR[XS] are placed into the byte at target memory address EA; the contents of the next byte element (byte element 1) of the source register VSR[XS] are placed into the byte in memory at target address EA+1; and so on until the contents of the last byte element (byte element 15) of the target register VSR[XS] are placed into the byte in memory at address EA+15.

If, however, the vector processor 100 determined at block 370 that the endian mode is specified as little-endian byte ordering, then at block 390 the vector processor 100 copies 16 bytes (128 bits) from the source vector register to the target memory address such that: the contents of the last byte element (byte element 15) of the source register VSR[XS] are placed into the byte at target memory address EA; the contents of the next-to-last byte element (byte element 14) of the source register VSR[XS] are placed into the byte in memory at target address EA+1; and so on until the contents of the first byte element (byte element 0) of the target register VSR[XS] are placed into the byte in memory at address EA+15.

Figure 4:
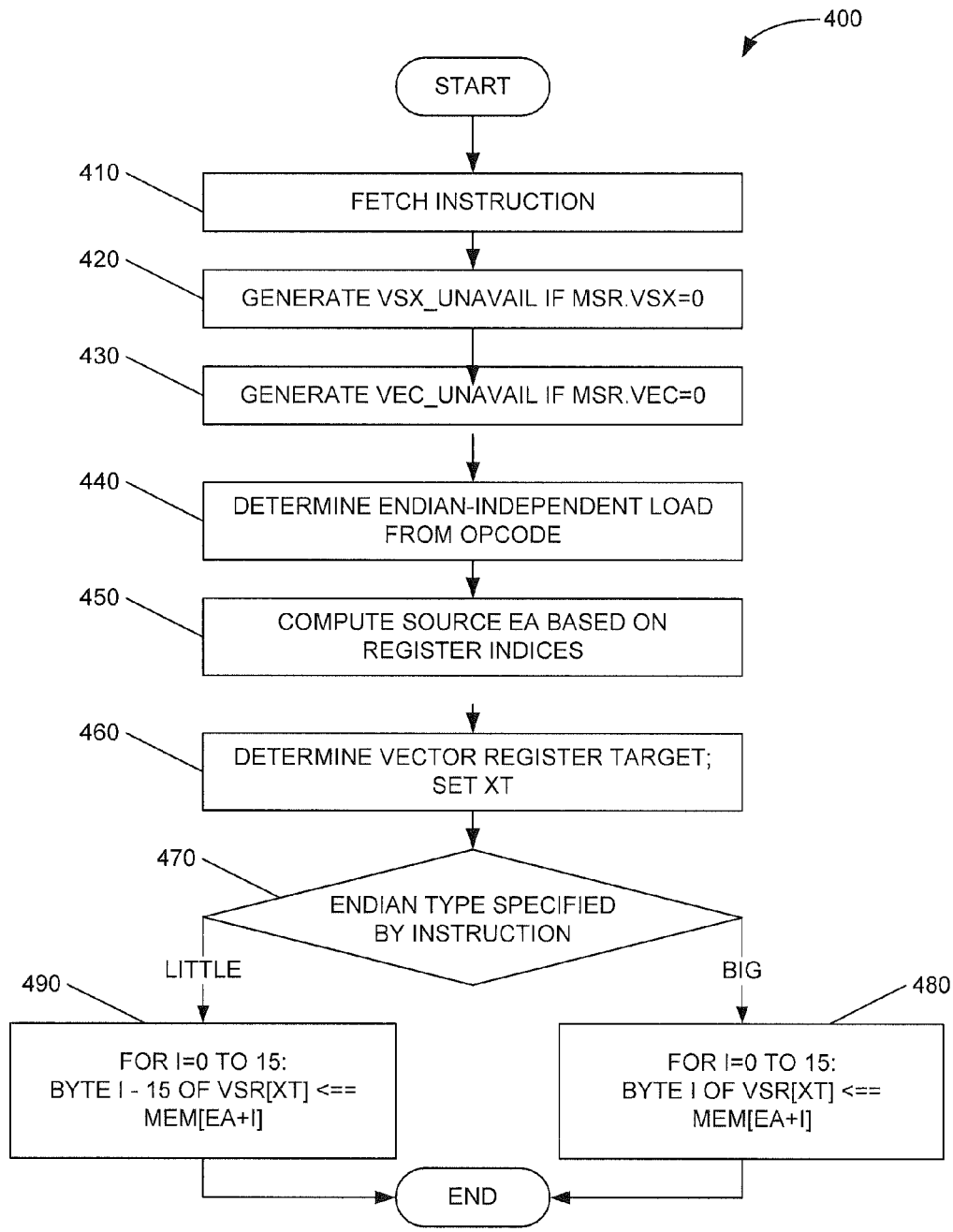
FIG. 4 depicts a process flow for an endian-mode-independent vector load instruction in accordance with an embodiment.

Referring to FIG. 4, a process flow is shown for executing an endian-mode-independent vector load instruction, in accordance with an embodiment of the vector processor 100. In this example embodiment, the endian-mode-independent vector load instruction uses the syntax lxvb16x(XT, RA, RB) and the following instruction format:

| 0  | 6 | 11 | 16 | 21  | 31 |
|----|---|----|----|-----|----|
| 31 | T | RA | RB | 876 | Tx | where RA and RB are index registers which combine to form an effective address into memory 180 as the source of the load, and the T field and the Tx bit combine to specify a particular vector register 160 as the target of the load.

The process 400 begins at block 410, where the next instruction is fetched, or obtained, from memory. Persons of ordinary skill in the art should appreciate that instructions may be stored in the same memory as data, or in different memory, and may be stored in main memory or cache memory. The vector processor 100 then checks for exceptions. At block 420, a Vector Scalar Extensions Unavailable (VSX_Unavailable) exception is generated if a VSX bit in the machine state register 190 is not set. At block 430, a Vector Scalar Unit Unavailable (VEC_Unavailable) exception is generated if a VEC bit in the machine state register 190 is not set.

If no exceptions are raised, the vector processor 100 continues decoding at block 440 where the vector processor 100 examines the opcode field(s) in the fetched instruction and determines that the instruction corresponds to an endian-mode-sensitive vector store instruction (lxvb16x). Next, at block 450, the vector processor 100 computes the effective address into memory 180, i.e., the source address of the load. The effective address is computed using the index registers specified by the RA and RB fields in the instruction. In some embodiments, the effective address EA is the sum of the contents of the RBth entry in the vector register file 150 plus either the contents of the RAth entry in the vector register file 150 or zero if RA is zero. In other words, EA=((RA=0) ? 0: GPR[RA])+$_{tea}$GPR[RB].

The vector processor 100 continues decoding at block 460 by determining the target register of the load, specified by the Tx and T bits in the fetched instruction. In some embodiments, the target register is an index into the vector register file 150, computed as VSR[XT]=32*Tx+T.

Next, at block 470 the vector processor 100 determines whether the vector instruction fetched at block 410 specifies big-endian byte ordering or little-endian byte ordering. If the instruction specifies big-endian byte ordering, then processing continues at block 480. If the instruction specifies little-endian byte ordering, then processing continues at block 490.

The vector processor 100 performs big-endian vector load at block 480 by copying 16 bytes (128 bits) from the source memory address to the target vector register such that: the contents of the byte in memory at address EA are placed into the first byte element (byte element 0) of the target register VSR[XT]; the contents of the byte in memory at address EA+1 are placed into the next byte element (byte element 1) of the target register VSR[XT]; and so on until the contents of the byte in memory at address EA+15 are placed into the last byte element (byte element 15) of the target register VSR[XT]. Execution of the endian-mode-independent vector load is then complete.

If, however, the vector processor 100 determined at block 410 that the fetched instruction specified a little-endian byte order, then at block 490 the vector processor 100 copies 16 bytes (128 bits) from the source memory address to the target vector register such that: the contents of the byte in memory at address EA are placed into the last byte element (byte element 15) of the target register VSR[XT]; the contents of the byte in memory at address EA+1 are placed into the next-to-last byte element (byte element 14) of the target register VSR[XT]; and so on until the contents of the byte in memory at address EA+15 are placed into the first byte element (byte element 0) of the target register VSR [XT].

Figure 5:
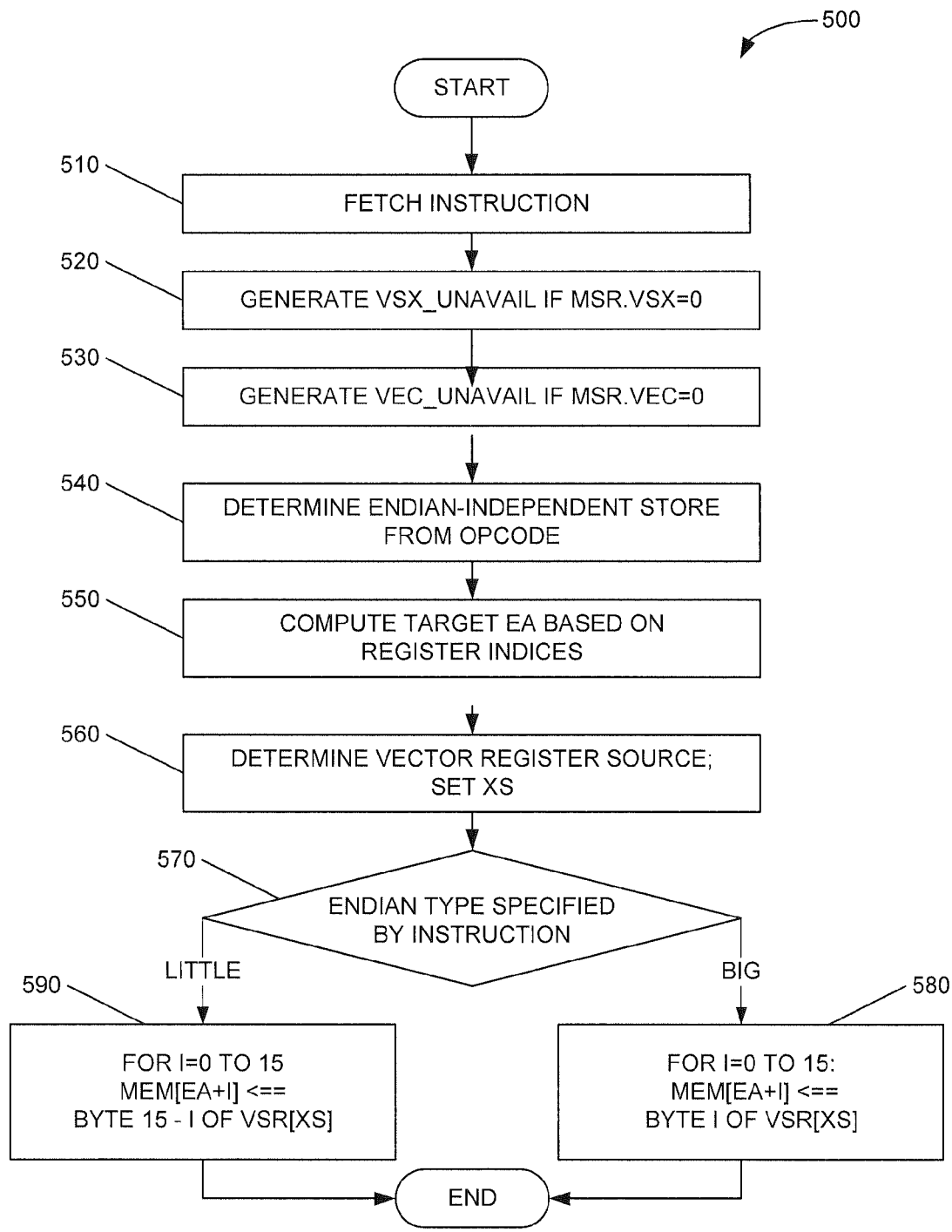
FIG. 5 depicts a process flow for an endian-mode-independent vector store instruction in accordance with an embodiment.

Referring to FIG. 5, a process flow is shown for executing an endian-mode-independent vector store instruction, in accordance with an embodiment of the vector processor 100. In this example embodiment, the endian-mode-independent vector load instruction uses the syntax stxvb16x(XS, RA, RB) and the following instruction format:

| 0  | 6 | 11 | 16 | 21   | 31 |
|----|---|----|----|------|----|
| 31 | S | RA | RB | 1004 | Sx | where the S field and the Sx bit combine to specify a particular vector register 160 as the source of the store, and RA and RB are index registers which combine to form an effective address into memory 180 as the target of the store.

The process 500 begins at block 510, where the next instruction is fetched, or obtained, from memory. Persons of ordinary skill in the art should appreciate that instructions may be stored in the same memory as data, or in different memory, and may be stored in main memory or cache memory. Next, at block 520, the vector processor 100 examines the opcode field(s) in the fetched instruction and determines that the instruction corresponds to an endian-mode-independent vector store instruction (stxvb16x).

Having determined that the instruction is an endian-mode-independent vector load instruction, the vector processor 100 checks for exceptions. At block 530, a Vector Scalar Extensions Unavailable (VSX_Unavailable) exception is generated if a VSX bit in the machine state register 190 is not set. At block 540, a Vector Scalar Unit Unavailable (VEC_Unavailable) exception is generated if a VEC bit in the machine state register 190 is not set.

If no exceptions are raised, the vector processor 100 continues decoding at block 550 by computing the effective address into memory 180, i.e., the target address of the store. The effective address is computed using the index registers specified by the RA and RB fields in the instruction. In some embodiments, the effective address EA is the sum of the contents of the RBth entry in the vector register file 150 plus either the contents of the RAth entry in the vector register file 150 or zero if RA is zero. In other words, EA=((RA=0) ? 0: GPR[RA])+$_{tea}$GPR[RB].

The vector processor 100 continues decoding at block 560 by determining the source register for the store, specified by the Sx and S bits in the fetched instruction. In some embodiments, the target register is an index into the vector register file 150, computed as VSR[SX]=32*Sx+S.

Next, at block 570 the vector processor 100 determines whether the vector instruction fetched at block 510 specifies big-endian byte ordering or little-endian byte ordering. If the instruction specifies big-endian byte ordering, then processing continues at block 580. If the instruction specifies little-endian byte ordering, then processing continues at block 590.

The vector processor 100 performs big-endian vector store at block 580 by copying 16 bytes (128 bits) from the source vector register to the target memory address such that: the contents of the first byte element (byte element 0) of the source register VSR[XS] are placed into the byte at target memory address EA; the contents of the next byte element (byte element 1) of the source register VSR[XS] are placed into the byte in memory at target address EA+1; and so on until the contents of the last byte element (byte element 15) of the target register VSR[XS] are placed into the byte in memory at address EA+15.

If, however, the vector processor 100 determined at block 570 that the fetched instruction specified a little-endian byte order, then at block 590 the vector processor 100 copies 16 bytes (128 bits) from the source vector register to the target memory address such that: the contents of the last byte element (byte element 15) of the source register VSR[XS] are placed into the byte at target memory address EA; the contents of the next-to-last byte element (byte element 14) of the source register VSR[XS] are placed into the byte in memory at target address EA+1; and so on until the contents of the first byte element (byte element 0) of the target register VSR[XS] are placed into the byte in memory at address EA+15.

Such endian-mode-sensitive and endian-mode-independent instructions may be implemented in a processor of a data processing system. Such a data processing system may have one or more processors in which each processor, or a subset of processors, may implement the endian-mode-sensitive and endian-mode-independent embodiments described herein. The types of data processing systems in which processors have endian-mode-sensitive and endian-mode-independent in accordance with one or more illustrative embodiments may vary considerably, and thus, the present description cannot address each such possible processor architecture. However, for purposes of illustration, FIG. 6 is provided as an example of one type of data processing system in which the endian-mode-sensitive and endian-mode-independent instructions of one or more illustrative embodiments may be implemented.

Figure 6:
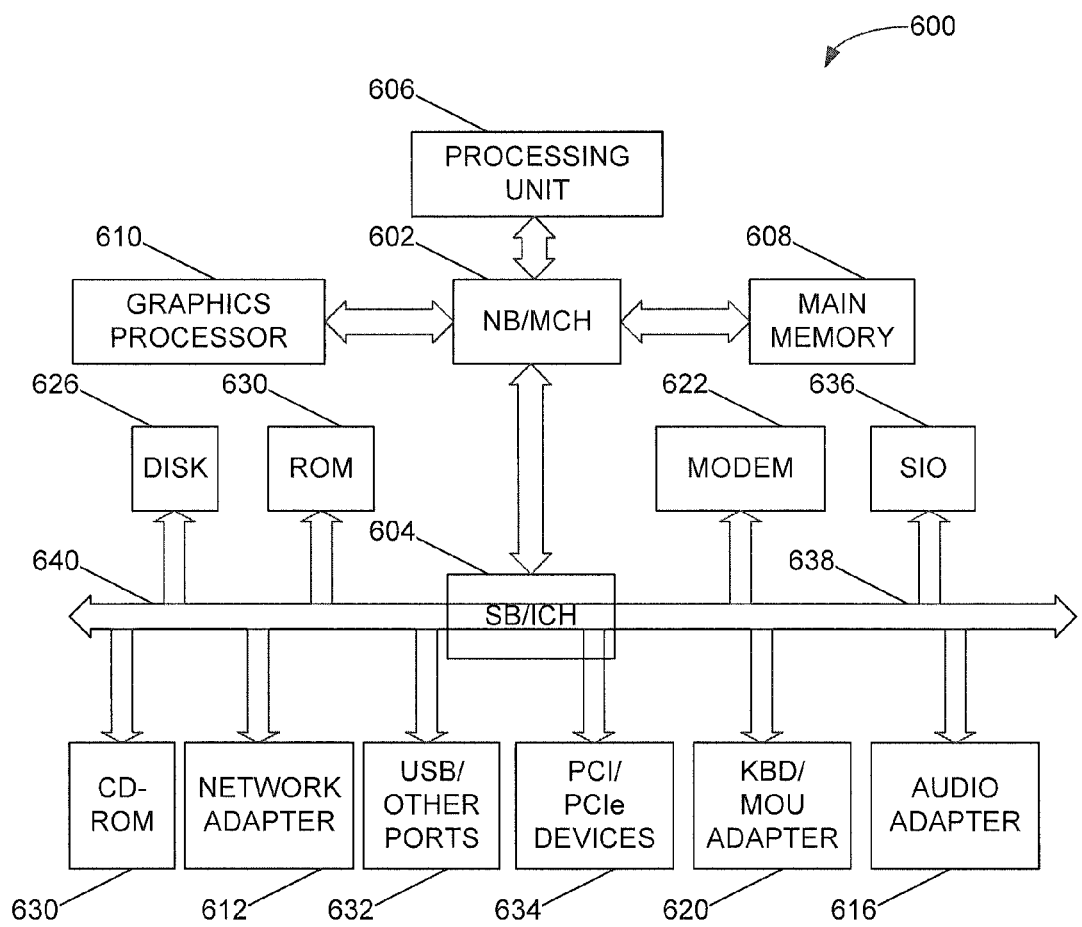
FIG. 6 depicts a block diagram of a data processing system in accordance with an embodiment.

Referring to FIG. 6, a block diagram of a data processing system is shown in which aspects of one or more illustrative embodiments may be implemented. Data processing system 600 is an example of a computer, in which computer usable code or instructions implementing the processes for one or more embodiments disclosed herein may be located.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 630 may be, for example, a flash binary input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within data processing system 600 in FIG. 6. As a client, the operating system may be a commercially available operating system such as Microsoft® Windows® XP (Microsoft and Windows are trademarks of Microsoft Corporation in the United States, other countries, or both) or the Linux® operating system (Linux is a trademark of Linus Torvalds in the United States, other countries, or both). An object-oriented programming system, such as the Java™ programming system, may run in conjunction with the operating system and provides calls to the operating system from Java™ programs or applications executing on data processing system 600 (Java is a trademark of Sun Microsystems, Inc. in the United States, other countries, or both).

As a server, data processing system 600 may be, for example, an IBM® eServer™ System p® computer system, running the Advanced Interactive Executive (AIX®) operating system or the Linux® operating system (eServer, System p® and AIX are trademarks of International Business Machines Corporation in the United States, other countries, or both). Data processing system 600 may be a symmetric multiprocessor (SMP) system including a plurality of processors, such as the POWER® processor available from International Business Machines Corporation of Armonk, N.Y., in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for one or more illustrative embodiments may be performed by processing unit 606 using computer usable program code, which may be located in a memory, such as, for example, main memory 608, ROM 624, or in one or more peripheral devices 626 and 630, for example.

A bus system, such as bus 638 or bus 640, as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache, such as found in NB/MCH 602 in FIG. 6.

Those of ordinary skill in the art will appreciate that the hardware in FIG. 6 may vary depending on the implementation. Other internal hardware or peripheral devices, such as flash memory, equivalent non-volatile memory, or optical disk drives and the like, may be used in addition to or in place of the hardware depicted in FIG. 6. Also, the processes of one or more illustrative embodiments may be applied to a multiprocessor data processing system, other than the SMP system mentioned previously, without departing from the spirit and scope of one or more aspects of the present invention.

Moreover, data processing system 600 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As will be appreciated by one of average skill in the art, aspects of embodiments may be embodied as a system, method, or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

Figure 7:
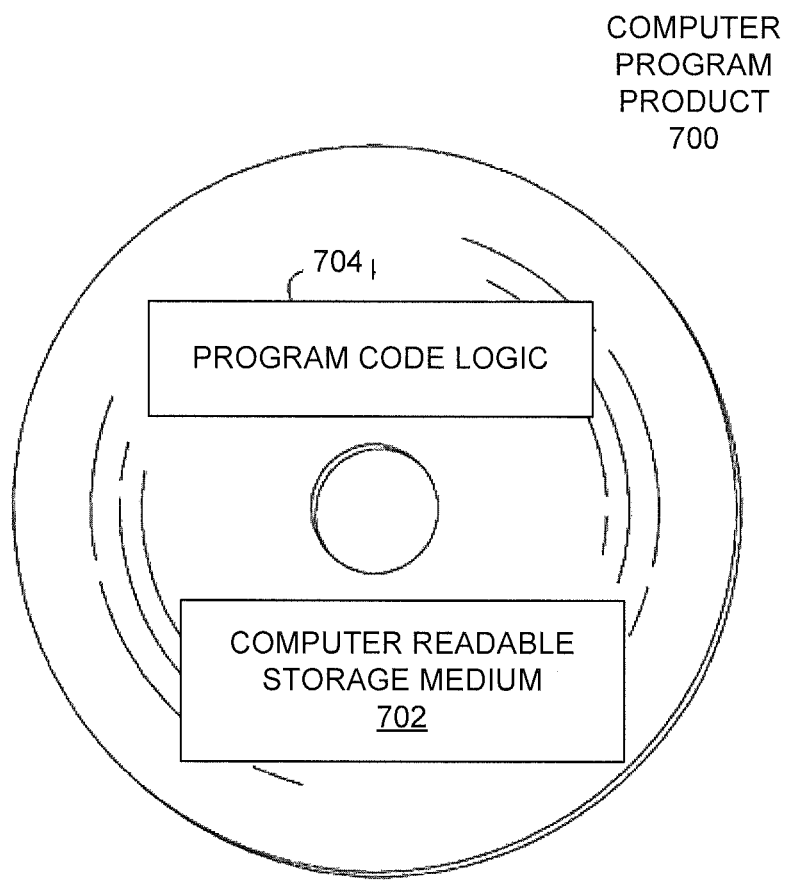
FIG. 7 illustrates a computer program product in accordance with an embodiment.

Referring to FIG. 7, one or more aspects of embodiments can be included in an article of manufacture (e.g., one or more computer program products 700) having, for instance, computer readable storage media 702. The media has embodied therein, for instance, computer readable program code (instructions) 704 to provide and facilitate the capabilities of embodiments. The article of manufacture can be included as a part of a computer system or as a separate product.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network, and/or wireless network. The network may comprise copper transmission cables, optical transmission fibers, wireless transmission, routers, firewalls, switches, gateway computers, and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects and benefits of various embodiments described herein include fixed-endian instruction load and store instructions, in which one particular endian mode (e.g., big-endian) is used when transferring data between memory and a vector register, regardless of the current endian-mode of the processor. Technical effects and benefits also include endian-mode-independent load and store instructions, in which the instruction itself, rather than the current endian-mode of the processor, controls the endian mode to be used when transferring data between memory and a vector register.

What is claimed is:

1. A computer system for copying data, the system comprising:
    a memory that is byte addressable;
    a processor including a first register that includes a plurality of byte elements 0 to S, the processor a bi-endian processor configurable to operate in a global endian mode when transferring data between the memory and the first register, the global endian mode setting selectable by the processor from the group consisting of a big-endian mode and a little-endian mode; and
    a machine state register for specifying a current global endian mode setting of the processor;
    wherein the system is configured to perform a method comprising:
        obtaining, by the processor operating in the current global endian mode, an instruction;
        determining that the instruction is a memory access instruction specifying the first register an endian mode, and further specifying a memory address; and
        in response to the determination that the instruction is a memory access instruction overriding the current global endian mode and executing the memory access instruction by copying byte data between the memory and the first register so that the byte element n of the first register corresponds to the memory address+n for n=0 to S.

2. The computer system of claim 1, where the first register corresponds to a vector register.

3. The computer system of claim 1, wherein an element ordering used by the instruction is independent of the endian mode.

4. The computer system of claim 1, wherein the current global endian mode of the processor is directly specified by a field in the memory access instruction.

5. The computer system of claim 1, the method further comprising:
    obtaining, by the processor, another instruction;
    determining that the another instruction is a second memory access instruction specifying a second register having T byte elements and a second memory address; and
    in response to the determination that the another instruction is a second memory access instruction and responsive to the current global endian mode setting, executing the second memory access instruction by copying byte data between the memory and the second register so that
        responsive to a first endian mode being selected in the current global endian mode setting, a byte element n of the second register corresponds to memory address+n for n=0 to T, and
        responsive to a second endian mode being selected in the current global endian mode setting a byte element T-n of the second register corresponds to memory address+n for n=0 to T.

6. The computer system of claim 1, wherein the instruction corresponds to an endian-mode-independent load instruction and the another instruction corresponds to an endian-mode-sensitive load instruction.

7. The computer system of claim 1, further including processing a data item with a computational instruction in an order dependent manner regardless of the current global endian mode setting.

8. The computer system of claim 1, wherein the copying further comprises copying the byte data from the memory to the first register so that the byte data at memory address+n is copied to the byte element n of the first register for n=0 to S.

9. The computer system of claim 1, wherein the copying further comprises copying the byte data from the first register to the memory so that the byte element n of the first register is copied to the memory address+n for n=0 to S.

10. A computer program product for copying data between a memory that is byte addressable and a vector register that includes a plurality of byte elements 0 to S, the computer program product comprising:

a non-transitory storage medium readable by a processing circuit and storing instructions for execution by the processing circuit for performing a method comprising:

obtaining, by a processor in a computer, a vector instruction, the processor operating in a current global endian mode and including a machine state register for specifying the current global endian mode setting of the processor, the processor a bi-endian processor configurable to operate in a global endian mode when transferring data between the memory and the vector register, the global endian mode setting selectable by the processor from the group consisting of a big-endian mode and a little-endian mode;

determining that the vector instruction is a memory access instruction specifying the vector register an endian mode and a memory address; and in response to the determination that the instruction is a memory access instruction, overriding the current global endian mode and executing the memory access instruction by copying byte data between the memory and the vector register so that the byte element n of the vector register corresponds to the memory address+n for n=0 to S.

11. The computer program product of claim 10, wherein the current global endian mode setting of the processor is overridden as specified in the memory access instruction.

\* \* \* \* \*